United States Patent
Uemura et al.

(10) Patent No.: US 10,270,380 B2
(45) Date of Patent: Apr. 23, 2019

(54) POWER CONVERTING APPARATUS AND HEAT PUMP DEVICE

(71) Applicant: Mitsubishi Electric Corporation, Tokyo (JP)

(72) Inventors: Keisuke Uemura, Tokyo (JP); Kazunori Hatakeyama, Tokyo (JP); Yosuke Shinomoto, Tokyo (JP); Takahiko Kobayashi, Tokyo (JP); Yasuhiko Wada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/751,183

(22) PCT Filed: Sep. 4, 2015

(86) PCT No.: PCT/JP2015/075211
§ 371 (c)(1),
(2) Date: Feb. 8, 2018

(87) PCT Pub. No.: WO2017/037945
PCT Pub. Date: Mar. 9, 2017

(65) Prior Publication Data
US 2018/0241336 A1 Aug. 23, 2018

(51) Int. Cl.
*H02P 27/08* (2006.01)
*F25B 31/02* (2006.01)
(Continued)

(52) U.S. Cl.
CPC ............ *H02P 27/085* (2013.01); *F25B 31/02* (2013.01); *H02M 7/53871* (2013.01);
(Continued)

(58) Field of Classification Search
CPC ........ H02P 27/08; H02P 27/085; H02P 27/04; H02M 7/537; H02M 7/5395; H02M 7/53871
See application file for complete search history.

(56) References Cited

U.S. PATENT DOCUMENTS 6,220,045 B1 * 4/2001 Kim ...................... F25B 49/025
62/228.4
6,710,564 B2 * 3/2004 Shibuya .................... H02P 6/18
318/400.13
(Continued)

FOREIGN PATENT DOCUMENTS

JP 2007-244106 A 9/2007
JP 2007244106 A * 9/2007
(Continued)

OTHER PUBLICATIONS

International Search Report of the International Searching Authority dated Oct. 6, 2015 for the corresponding International application No. PCT/JP2015/075211 (and English translation).
(Continued)

*Primary Examiner* — Thai T Dinh
(74) *Attorney, Agent, or Firm* — Posz Law Group, PLC

(57) ABSTRACT

A power converting apparatus includes: an inverter converting a direct-current voltage supplied from a power supply unit into an alternating-current voltage and outputting the alternating-current voltage to a motor; and an inverter control unit outputting synchronous PWM (Pulse Width Modulation) signals for driving switching elements of the inverter. A frequency of the synchronous PWM signals is periodically varied when periodic pulsation occurs in a load connected to the motor.

2 Claims, 14 Drawing Sheets

(51) Int. Cl.
*H02M 7/5387* (2007.01)
*H02P 21/05* (2006.01)
*F25B 13/00* (2006.01)

(52) U.S. Cl.
CPC .............. *H02P 21/05* (2013.01); *F25B 13/00* (2013.01); *F25B 2600/021* (2013.01); *Y02B 30/741* (2013.01)

(56) References Cited

U.S. PATENT DOCUMENTS

| | | | |
|---|---|---|---|
| 7,528,585 B2* | 5/2009 | Maehara | H02J 7/244 |
| | | | 322/29 |
| 9,242,564 B2* | 1/2016 | Feichtinger | B60L 7/14 |
| 9,318,976 B1* | 4/2016 | Wei | H02M 7/537 |
| 9,595,907 B2* | 3/2017 | Marohl | H02P 27/085 |
| 9,825,575 B2* | 11/2017 | Yamakawa | F24F 1/0007 |
| 2009/0237015 A1* | 9/2009 | Hashimoto | H02P 21/0089 |
| | | | 318/400.02 |

FOREIGN PATENT DOCUMENTS

| | | | |
|---|---|---|---|
| JP | 2011-066949 A | | 3/2011 |
| JP | 2011061884 A | * | 3/2011 |

OTHER PUBLICATIONS

Office action dated Aug. 28, 2018 issued in corresponding JP patent application No. 2017-537180 (and English machine translation thereof).

\* cited by examiner

POWER CONVERTING APPARATUS AND HEAT PUMP DEVICE

CROSS REFERENCE TO RELATED APPLICATION

This application is a U.S. national stage application of International Patent Application No. PCT/JP2015/075211 filed on Sep. 4, 2015, the disclosure of which is incorporated herein by reference.

TECHNICAL FIELD

The present invention relates to a power converting apparatus that converts a direct-current voltage into an alternating-current voltage, and also relates to a heat pump device.

BACKGROUND

Synchronous Pulse Width Modulation (PWM) signals for driving switching elements that constitute an inverter are often generated by a PWM method. The PWM method is a method to appropriately control the ratio between ON-time and OFF-time in a switching period that is a specific period of time in order to output a voltage that can be instantaneously output by the switching elements, that is, a voltage between a voltage applied between a collector and an emitter and a zero voltage, as the average voltage in the switching period.

The PWM method includes an asynchronous PWM method and a synchronous PWM method. A synchronous PWM signal for a switching element in the PWM method is generated by a carrier-wave comparison method to compare the magnitude of an intended output-voltage command value and a carrier wave. In the following descriptions, the intended output-voltage command value is referred to as "output-voltage command value" and the carrier wave is referred to as "carrier".

The synchronous PWM method is a method to control the carrier frequency so as to become an integer multiple of the frequency of an output-voltage command value, that is, to control the carrier frequency on the basis of the frequency of the output-voltage command value. The asynchronous PWM method is a method used when the carrier frequency is fixed at any frequency of the output-voltage command value.

The frequency of the output-voltage command value varies on the basis of the load state. In particular, in a case where a load of an inverter is a motor, as the rotation speed of the motor is increased, the frequency of the output-voltage command value becomes higher. Patent Literature 1 discloses an inverter device to which direct-current power is input. By using the PWM method, the inverter device applies alternating-current power of a given voltage and frequency to a motor to drive the motor at variable speeds.

Patent Literature

Patent Literature 1: Japanese Patent Application Laid-open No. 2011-66949

Furthermore, Patent Literature 1 discloses controlling the carrier frequency so as to become an integer multiple of the frequency of an output-voltage command value and controlling the amount of change in a PWM frequency on the basis of the motor acceleration and noise level.

However, Patent Literature 1 describes an asynchronous PWM method to control the carrier frequency and the voltage command value asynchronously and does not take any measure against pulsation of the load. When the inverter device described in Patent Literature 1 is applied to a compressor of an air conditioner, the load torque may pulsate periodically due to intake, compression, and discharge in an operating cycle of the compressor, and accordingly the rotation speed and the rotation position of the motor may pulsate. Thus, the inverter device cannot sometimes perform synchronous PWM modulation in a stable manner.

SUMMARY

The present invention has been achieved to solve the above problems, and an object of the present invention is to provide a power converting apparatus that can perform synchronous PWM modulation in a stable manner even when the load torque pulsates periodically.

To solve the above problems and achieve the object, a power converting apparatus according to an aspect of the present invention includes: an inverter converting a direct-current voltage supplied from a power supply unit into an alternating-current voltage and outputting the alternating-current voltage to a motor; and an inverter control unit outputting a synchronous PWM (Pulse Width Modulation) signal for driving a switching element of the inverter. A frequency of the synchronous PWM signal is periodically varied when periodic pulsation occurs in a load connected to the motor.

A power converting apparatus according to the present invention produces an effect where synchronous PWM modulation can be performed in a stable manner even when the load torque pulsates periodically.

DETAILED DESCRIPTION

A power converting apparatus and a heat pump device according to embodiments of the present invention will be described in detail below with reference to the accompanying drawings. The present invention is not limited by the embodiments.

First Embodiment

Figure 1:
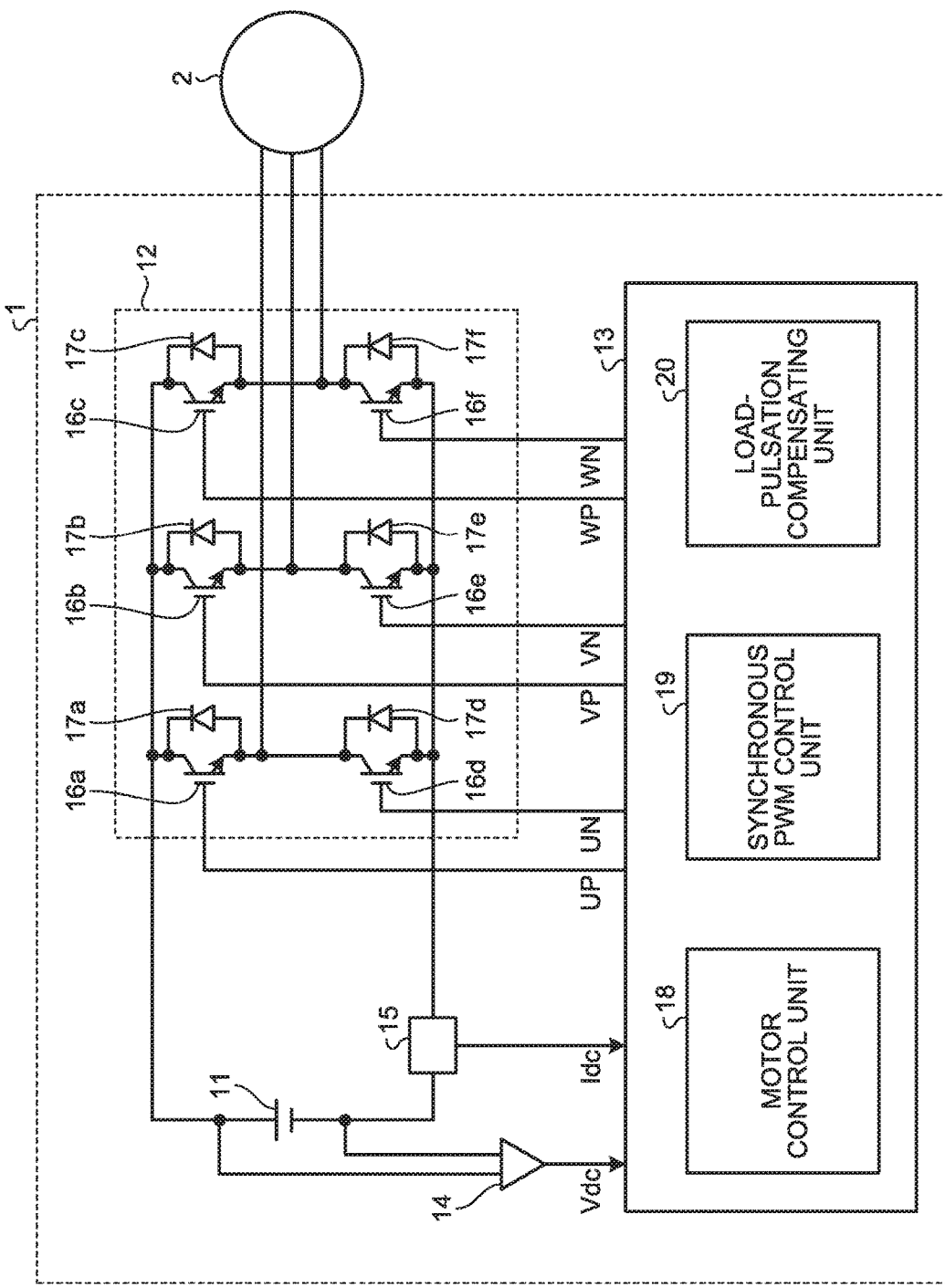
FIG. 1 is a diagram illustrating a configuration of a power converting apparatus according to a first embodiment.

FIG. 1 is a diagram illustrating a power converting apparatus 1 according to a first embodiment of the present invention. The power converting apparatus 1 includes an inverter 12 that converts a direct-current voltage supplied from a direct-current power supply 11 that is a power supply unit into an alternating-current voltage and outputs the alternating-current voltage to a motor 2; an inverter control unit 13 that outputs synchronous PWM signals for driving switching elements of the inverter 12; a direct-current-voltage detecting unit 14 that detects a voltage Vdc of the direct-current power supply 11; and a current detecting unit 15 that detects an electric current Idc flowing to the inverter 12.

The direct-current power supply 11 may be configured such that an alternating-current voltage is rectified by using a diode bridge to be converted into a direct-current voltage and the converted direct-current voltage is smoothed by using a smoothing capacitor. Furthermore, the direct-current power supply 11 may be configured from a direct-current power supply, a representative example of which is a solar cell or a battery.

The inverter 12 is configured to include switching elements 16a, 16b, 16c, 16d, 16e, and 16f and diodes 17a, 17b, 17c, 17d, 17e, and 17f connected in parallel with the switching elements 16a, 16b, 16c, 16d, 16e, and 16f, respectively.

Each of the switching elements 16a, 16b, 16c, 16d, 16e, and 16f is constituted by a transistor, an Insulated Gate Bipolar Transistor (IGBT), a Metal Oxide Semiconductor-Field Effect Transistor (MOS-FET), a thyristor, or a Gate Turn-Off Thysistor (GTO). The switching elements 16a, 16b, 16c, 16d, 16e, and 16f may be made of a semiconductor material such as Si or a wide bandgap semiconductor material such as SiC or GaN.

On the basis of the voltage Vdc detected by the direct-current-voltage detecting unit 14 and the electric current Idc detected by the current detecting unit 15, the inverter control unit 13 generates synchronous Pulse Width Modulation (PWM) signals UP, VP, WP, UN, VN, and WN, and applies the generated synchronous PWM signals UP, VP, WP, UN, VN, and WN to the inverter 12. Specifically, the synchronous PWM signal UP is applied to the switching element 16a. The synchronous PWM signal VP is applied to the switching element 16b. The synchronous PWM signal WP is applied to the switching element 16c. The synchronous PWM signal UN is applied to the switching element 16d. The synchronous PWM signal VN is applied to the switching element 16e. The synchronous PWM signal WN is applied to the switching element 16f.

In the inverter 12, on the basis of the application of the synchronous PWM signals UP, VP, WP, UN, VN, and WN, the switching elements 16a, 16b, 16c, 16d, 16e, and 16f are driven to apply a given voltage to the motor 2. The motor 2 is driven on the basis of the applied voltage.

The inverter control unit 13 includes a motor control unit 18 that generates voltage command values; a synchronous PWM control unit 19 that generates the synchronous PWM signals UP, VP, WP, UN, VN, and WN; and a load-pulsation compensating unit 20 that generates signals for compensating for pulsation of a load.

Figure 2:
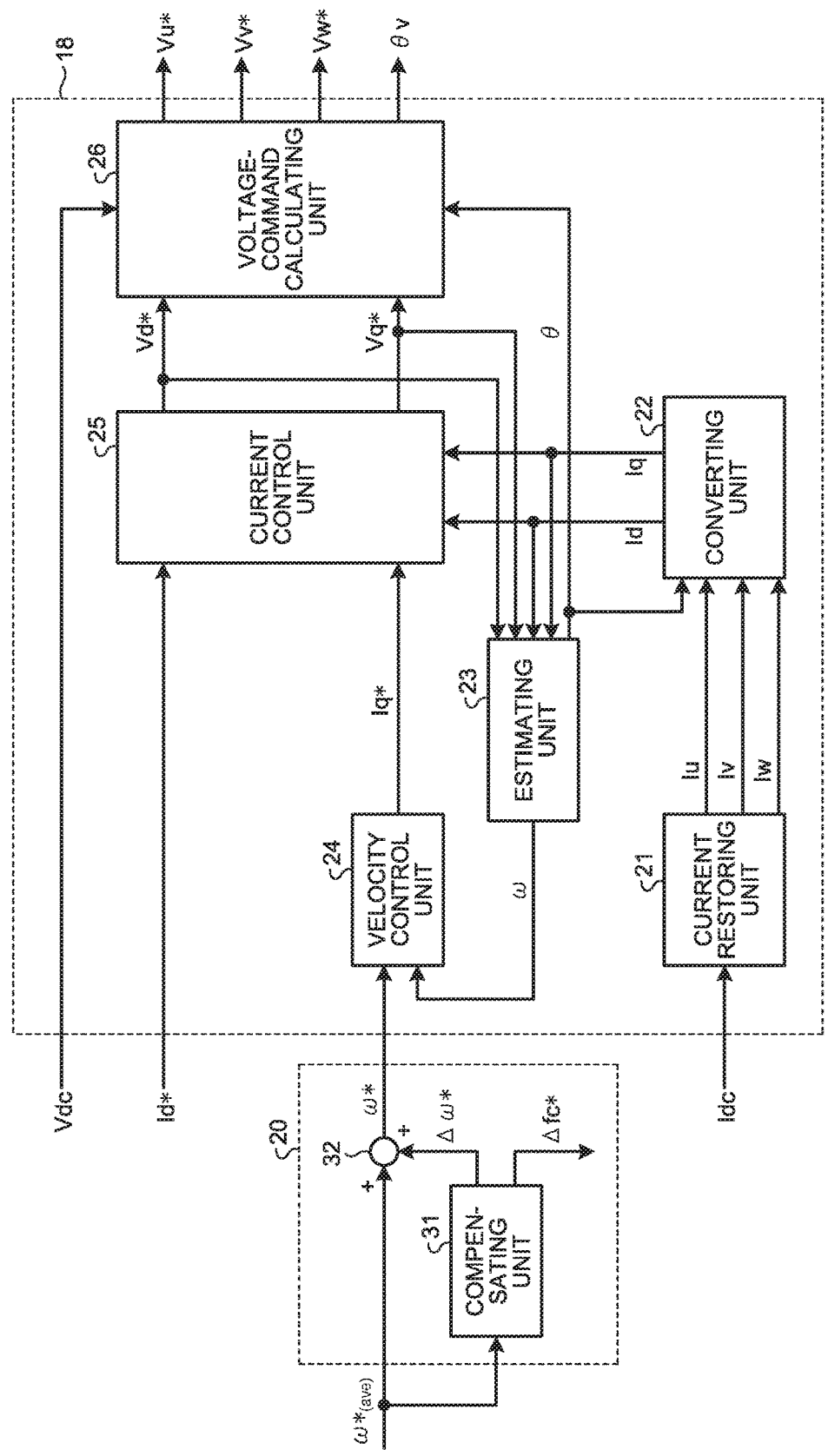
FIG. 2 is a diagram illustrating a configuration of a motor control unit and a load-pulsation compensating unit according to the first embodiment.

The configuration and operation of the motor control unit 18 are described below. FIG. 2 is a diagram illustrating the configuration of the motor control unit 18 and the load-pulsation compensating unit 20 according to the first embodiment. The motor control unit 18 includes a current restoring unit 21 that restores an electric current; a converting unit 22 that converts three phase currents into two phase currents and performs d-q conversion on the two phase currents; an estimating unit 23 that estimates the position and the velocity, a velocity control unit 24 that controls the velocity; a current control unit 25 that controls an electric current; and a voltage-command calculating unit 26 that generates voltage command values.

The current restoring unit 21 restores phase currents Iu, Iv, and Iw flowing to the motor 2 on the basis of the electric current Idc detected by the current detecting unit 15.

On the basis of a rotor magnetic-pole position θ of the motor 2, the converting unit 22 converts the phase currents Iu, Iv, and Iw, which are three phase currents, into two phase currents, and converts the two phase currents into a d-axis current Id and a q-axis current Iq on d-q coordinate axes.

The estimating unit 23 calculates the rotor magnetic-pole position θ and an estimated velocity value ω of the motor 2 on the basis of the electric currents Id and Iq and voltage command values Vd* and Vq* generated by the current control unit 25.

The velocity control unit 24 calculates a q-axis current command value Iq* such that the estimated velocity value ω corresponds with a velocity command value ω*.

The current control unit 25 calculates a d-axis voltage command value Vd* such that the d-axis current Id corresponds with an externally-input d-axis current command value Id*, and calculates a q-axis voltage command value Vq* such that the q-axis current Iq corresponds with the q-axis current command value Iq*.

The voltage-command calculating unit 26 calculates UVW-phase voltage command values Vu*, Vv*, and Vw* on the basis of the d-axis voltage command value Vd*, the q-axis voltage command value Vq*, the voltage Vdc detected by the direct-current-voltage detecting unit 14, and the rotor magnetic-pole position θ.

Figure 3:
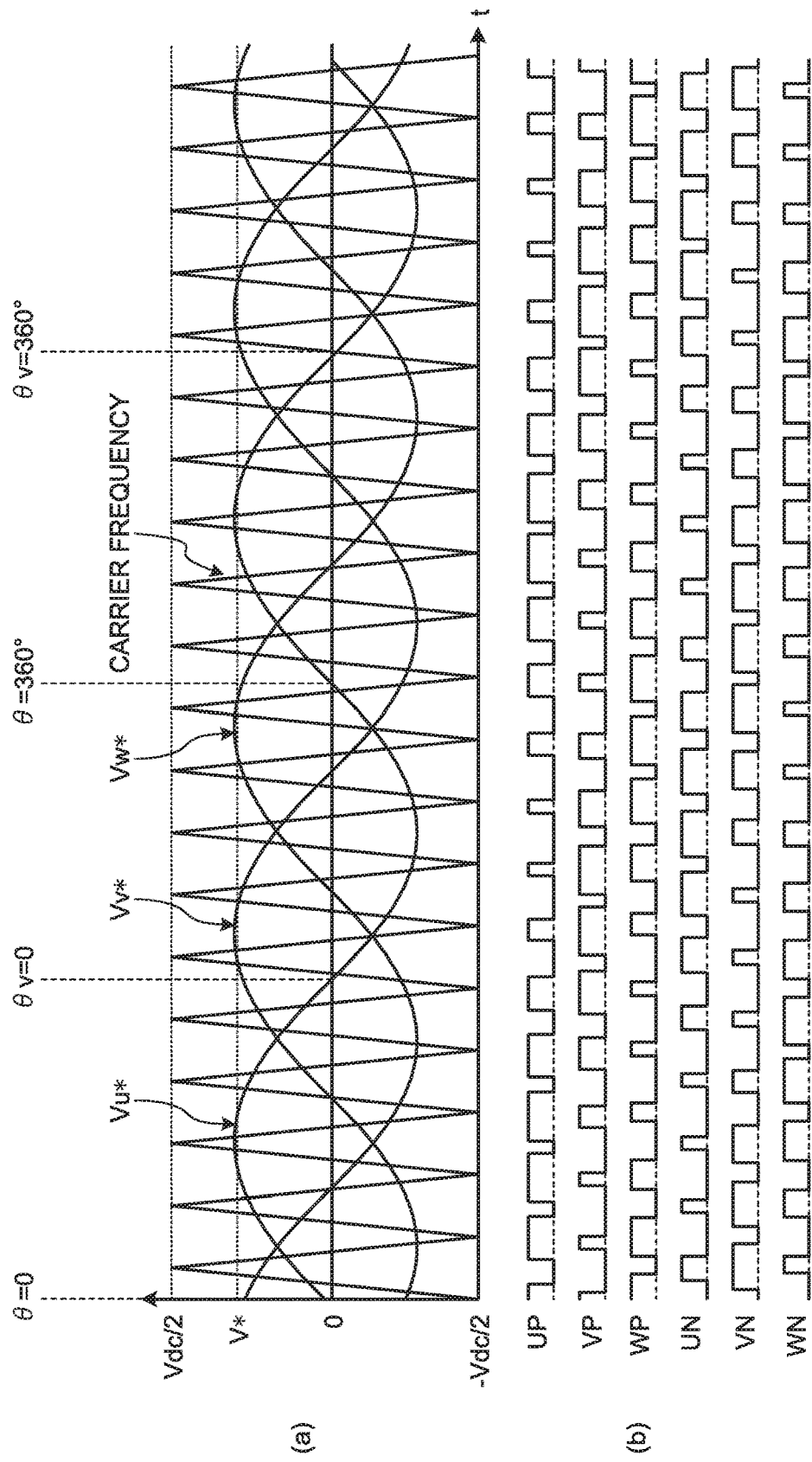
FIG. 3 is a diagram illustrating a relation between voltage command values and a carrier frequency according to the first embodiment.

FIG. 3(a) is a diagram illustrating a relation between the carrier frequency and the UVW-phase voltage command values Vu*, Vv*, and Vw* generated by the voltage-command calculating unit 26. FIG. 3(b) is a diagram illustrating waveforms of the synchronous PWM signals UP, VP, WP, UN, VN, and WN generated by the synchronous PWM control unit 19.

The voltage-command calculating unit 26 generates a voltage phase θv and outputs the generated voltage phase θv to the synchronous PWM control unit 19. Specifically, the voltage-command calculating unit 26 outputs the voltage phase θv using a falling zero-cross point of Vu* as a reference point. That is, the reference point is represented as "voltage phase θv=0". Any point may be used as a reference point of the voltage phase θv.

The synchronous PWM control unit 19 compares the carrier and the UVW-phase voltage command values Vu*, Vv*, and Vw* and generates the synchronous PWM signals UP, VP, WP, UN, VN, and WN, which will be described later in detail.

Next, the configuration and operation of the load-pulsation compensating unit 20 are described. The load-pulsation compensating unit 20 includes a compensating unit 31 that calculates a velocity command-value compensation amount Δω* and a carrier-frequency command-value compensation amount Δfc*; and an adder 32 that generates the velocity command value ω*.

The compensating unit 31 calculates the velocity command-value compensation amount Δω* and the carrier-frequency command-value compensation amount Δfc* on the basis of a velocity command value $\omega^*_{(ave)}$ provided from a higher-level controller for the motor control unit 18. The compensating unit 31 compensates for the velocity command value $\omega^*_{(ave)}$ by using the velocity command-value compensation amount Δω*. Further, the compensating unit 31 compensates for the carrier by using the carrier-frequency command-value compensation amount Δfc*. The velocity command-value compensation amount Δω* and the carrier-frequency command-value compensation amount Δfc* will be described later in detail.

The adder 32 adds the velocity command value $\omega^*_{(ave)}$ and the velocity command-value compensation amount Δω* together to generate the velocity command value ω*.

Figure 4:
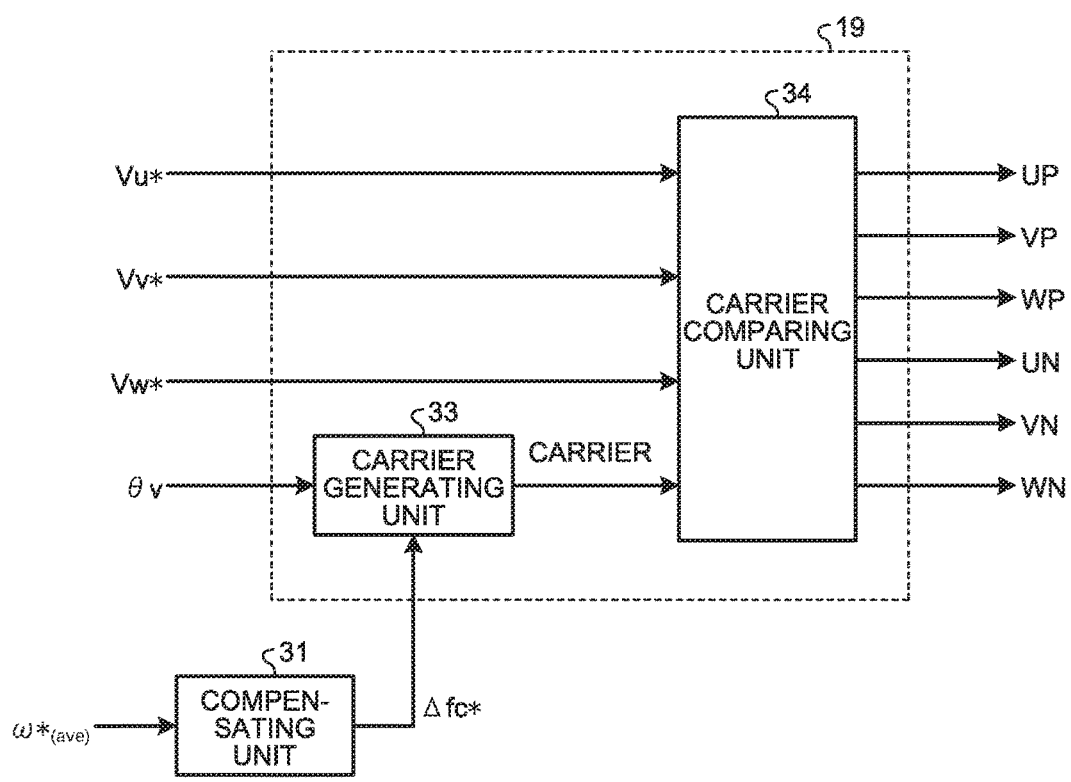
FIG. 4 is a diagram illustrating a configuration of a synchronous PWM control unit and a compensating unit according to the first embodiment.

Next, the configuration and operation of the synchronous PWM control unit 19 are described. FIG. 4 is a diagram illustrating the configuration of the synchronous PWM control unit 19 according to the first embodiment. The synchronous PWM control unit 19 includes a carrier generating unit 33 that generates a carrier; and a carrier comparing unit 34 that generates the synchronous PWM signals UP, VP, WP, UN, VN, and WN.

The carrier generating unit 33 generates a carrier to be synchronized with the voltage phase θv generated by the voltage-command calculating unit 26. Further, the carrier generating unit 33 compensates for the carrier by using the carrier-frequency command-value compensation amount Δfc*. The carrier-frequency command-value compensation amount Δfc* will be described later in detail.

The carrier generating unit 33 controls the frequency of a triangular-wave carrier so as to become 3n times the frequency of the U-phase voltage command value Vu*, where n is a natural number equal to or larger than one. The carrier generating unit 33 may control the frequency of a triangular-wave carrier so as to become 3n times the frequency of the V-phase voltage command value Vv* or the frequency of the W-phase voltage command value Vw*.

The carrier comparing unit 34 compares the carrier and the voltage command value Vu* and outputs a "High" or "Low" synchronous PWM signal. In a case where the frequency of a triangular-wave carrier is three times the frequency of a voltage command value, a synchronous PWM signal includes three pulses. In a case where the frequency of a triangular-wave carrier is six times the frequency of a voltage command value, a synchronous PWM signal includes six pulses. In a case where the frequency of a triangular-wave carrier is nine times the frequency of a voltage command value, a synchronous PWM signal includes nine pulses.

In a case where the carrier frequency is set to be nine or more times the frequency of a voltage command value, the number of pulses of a synchronous PWM signal per period of the voltage command value is increased. This improves the output-voltage accuracy. However, because the number of times the switching elements 16a, 16b, 16c, 16d, 16e, and 16f are switched increase, the switching loss is increased. That is, there is a trade-off relation between the magnitude of the carrier frequency and the switching loss.

Thus, the power converting apparatus 1 compensates for the velocity command value $\omega^*_{(ave)}$ by using the velocity command-value compensation amount Δω* generated by the load-pulsation compensating unit 20. Also, the power converting apparatus 1 compensates for the carrier by using the carrier-frequency command-value compensation amount Δfc* generated by the load-pulsation compensating unit 20. Thus, when periodic pulsation has occurred in a load connected to the motor 2, the frequency of a synchronous PWM signal output from the synchronous PWM control unit 19 is varied periodically such that the power converting apparatus 1 can perform synchronous PWM modulation in a stable manner.

A description will be given below of the influence on the rotation speed of the motor and on the rotation phase of the rotor when a load in which torque pulsation occurs at a constant period is connected to the motor 2 and of the cases when the response speed of the velocity control unit 24 is high and when the response speed of the velocity control unit 24 is low.

Figure 5:
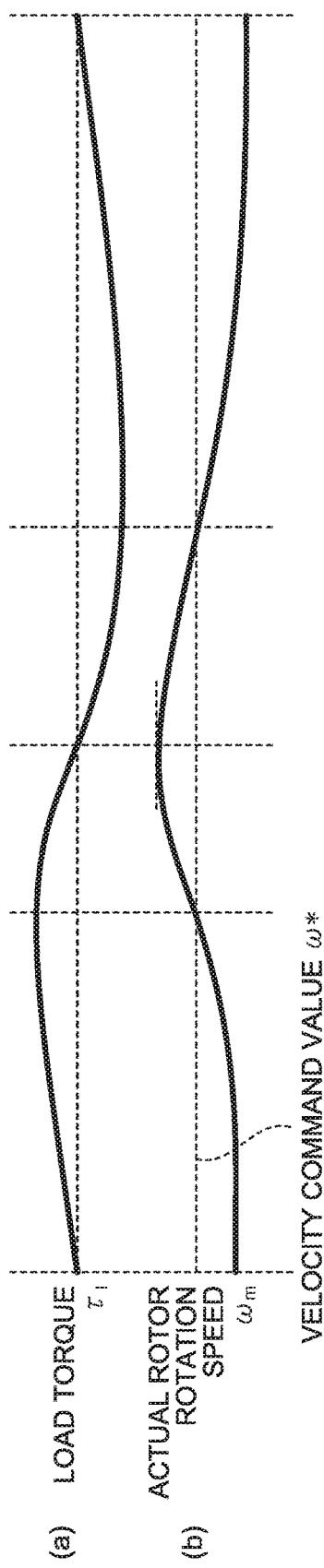
FIG. 5 is a diagram illustrating a relation between a load torque and a motor rotation speed according to the first embodiment.

FIG. 5 is a diagram illustrating a relation between the load torque and the actual rotor rotation speed in a case where the load in which torque pulsation occurs at a constant period is connected to the motor 2. In the following descriptions, the load is a compressor in which the load torque pulsates per period in mechanical angle. However, a pulsation pattern of the load torque illustrated in FIG. 5 is merely an example and any pulsation pattern may be employed.

When the velocity command value ω* is constant, the velocity control unit 24 generates the q-axis current command value Iq* that is a motor-current command value so as to maintain the motor rotation speed constant. It is known that the motor rotation speed is represented by the following Equation (1). $\omega_m$ indicates the actual rotor rotation speed that is the actual motor angular velocity. $\tau_m$ indicates the motor output torque. $\tau_l$ indicates the load torque. $J_m$ indicates the moment of inertia of the motor and the load.

$$d\omega_m/dt=(\tau_m-\tau_l)/J_m \quad (1)$$

On the basis of Equation (1), where "$\tau_m > \tau_l$", the rotor of the motor 2 is brought into an accelerating state, while where "$\tau_m < \tau_l$", the rotor of the motor 2 is brought into a decelerating state.

Thus, in order to control the rotor rotation speed of the motor 2 to be constant, it is necessary to control the motor output torque such that "$\tau_m = \tau_l$" is satisfied. In particular, when the moment of inertia $J_m$ is lower, the value on the right side of Equation (1) becomes larger. Thus, the sensitivity of the motor 2 to the rotor speed is increased. In order to control the motor output torque such that "$\tau_m = \tau_l$" is satisfied, it is necessary to increase the response speed of the velocity control unit 24. There is thus a possibility of causing overshoot in a transient response at the time of a start-up operation of the motor 2.

Further, when the response speed of the velocity control unit 24 is increased, the response speed of the current control unit 25 that is a minor loop also needs to be increased. It is general that the response speed of the current control unit 25 needs to be ten or more times the response speed of the velocity control unit 24. This may increase a harmonic component of a motor-current waveform and thus high-frequency sound may be generated from the motor 2.

Furthermore, when the response speed of the velocity control unit 24 and the current control unit 25 is increased, it is necessary to increase the estimated velocity value ω, a low-pass filter time constant $\tau_\omega$, for the d-axis current Id, and a low-pass filter time constant $\tau_i$ for the q-axis current Iq.

In an actual motor driving device to which the power converting apparatus 1 is applied, a pulsating component may be generated in the estimated velocity value ω, the d-axis current Id, and the q-axis current Iq. In particular, an offset that does not occur theoretically may cause an offset in the electric current Idc detected by the current detecting unit 15. In that case, in the current restoring unit 21, an offset occurs also in the phase currents Iu, Iv, and Iw having been restored on the basis of the electric current Idc. Further, an offset is superimposed as a pulsating component on the d-axis current Id and the q-axis current Iq that have been converted into a rotating coordinate system by the converting unit 22.

Because the frequency of this pulsating component is proportional to the rotation speed of the motor 2, a low-pass filter time constant (a cutoff frequency) is set on the basis of the minimum rotation speed of the motor 2. In order to ensure the stability of the velocity control unit 24 and the current control unit 25, the relation between the low-pass filter time constant (the cutoff frequency) and the response speed of the velocity control unit 24 and the current control unit 25 is important.

In order to increase the response speed in the entire control system, it is necessary to increase the low-pass filter time constant $\tau_\omega$, for the d-axis current Id and the low-pass filter time constant $\tau_i$ for the q-axis current Iq. In that case, in a low motor-speed range, the pulsating component cannot be completely removed from the estimated velocity value ω, the d-axis current Id, and the q-axis current Iq. Thus, the entire control system may become unstable and the rotation speed of the motor 2 also may become unstable.

It is general that motor control calculation is performed in synchronization with a carrier. A control period is determined by the carrier frequency. Thus, in order to increase the response speed of the entire control system, it is necessary to increase the control frequency as well as the carrier frequency. However, when the carrier frequency is increased, the number of times the inverter 12 is switched is increased and this increases the switching loss. Further, the level of vibration and radiation noise generated from the inverter 12 may be increased.

Next, a case where the response speed of the velocity control unit 24 is reduced is described. When the response speed of the velocity control unit 24 is reduced, the actual rotor rotation speed $\omega_m$ may become unstable. Moreover, follow-up performance of a voltage output from the inverter 12 may be degraded, pulsation may occur in the actual rotor rotation speed $\omega_m$, and noise may be generated from the motor 2.

Further, when the response speed of the velocity control unit 24 is reduced, a phase difference may occur between the rotor magnetic-pole position θ calculated by the estimating unit 23 and an actual rotor rotation position $\theta_1$ of the motor 2, and current ripples may occur on the basis of the phase difference.

Figure 6:
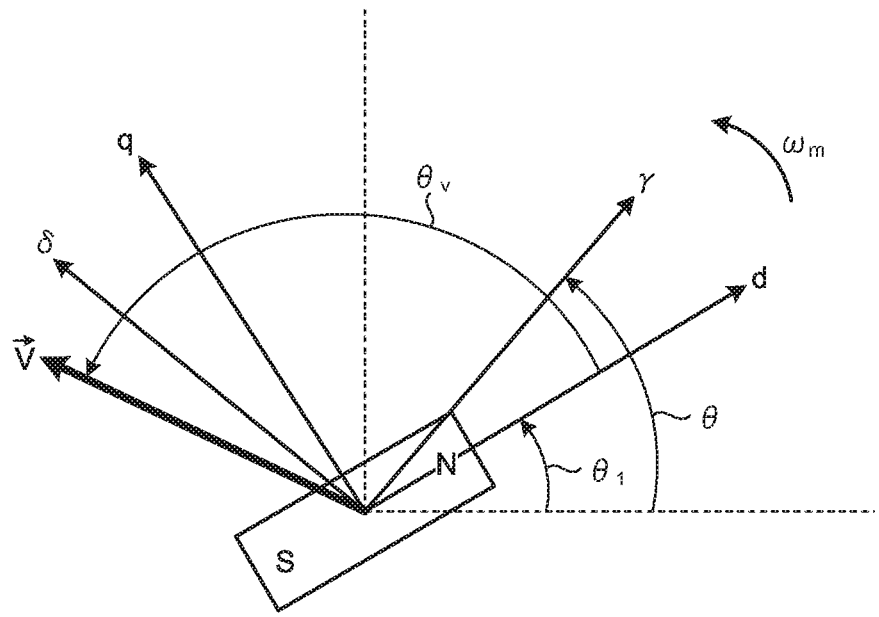
FIG. 6 is a diagram illustrating a relation between a rotor rotation axis and a control axis according to the first embodiment.

FIG. 6 is a diagram illustrating a relation between the actual rotor rotation position $\theta_1$ and the rotor magnetic-pole position θ of the motor 2. In the following descriptions, the d-q coordinates are defined on the actual rotor rotation position of the motor 2. The coordinates estimated by the estimating unit 23 in the control are defined on γ-δ axes. Further, in a case of sensorless position control, the motor control unit 18 does not have a mechanism that directly detects the d-q axes and thus executes control on the γ-δ axes estimated by the estimating unit 23. However, as illustrated in FIG. 6, γ-δ coordinates do not always correspond with the d-q coordinates.

In particular, in a case where pulsation occurs in a torque load, the actual rotor rotation speed $\omega_m$ pulsates and accordingly the actual rotor rotation position $\theta_1$ also pulsates. However, in a case where the response speed of the velocity control unit 24 is low, a phase relation $\theta_v$ between a voltage vector v output from the inverter 12 and the actual rotor rotation position $\theta_1$ pulsates and thus ripples are generated in the phase currents Iu, Iv, and Iw.

When ripples are generated in the phase currents Iu, Iv, and Iw, the noise level from the motor 2 may be increased. Further, a motor driving method may deviate from a motor driving method that is intended by a control-system designer and achieve maximum efficiency control or maximum power-factor control.

Furthermore, when the response speed of the velocity control unit 24 is reduced, there is a possibility of interference with the synchronous PWM control. In the synchronous PWM control, the carrier frequency and the frequency of a voltage command value are controlled so as to have a fixed relationship, and thereby the inverter 12 and the motor 2 are controlled in a stable manner even at a low carrier frequency.

Thus, if the carrier frequency and the frequency of the voltage command value cannot be controlled so as to have a fixed relationship, a frequency component that is different from an intended frequency component is superimposed on a PWM signal for driving a switching element of the inverter 12 and on a voltage command value output from the inverter 12 to the motor 2. In particular, when the number of pulses in the synchronous PWM control is set small, there is a tendency for the sensitivity to the current ripples to increase, the current ripples being caused by the phase difference between the carrier and the voltage command value output from the inverter 12 to the motor 2 and also caused by the phase difference between the actual rotor rotation position $\theta_1$ and the rotor magnetic-pole position θ of the motor 2.

The current ripples make the motor control and the synchronous PWM control unstable. Thus, the phase difference between the carrier and the voltage command value output from the inverter 12 to the motor 2 and the phase difference between the actual rotor rotation position $\theta_1$ and the rotor magnetic-pole position θ of the motor 2 may increase.

Accordingly, in a case where a load in which torque pulsation occurs at a constant period is connected to the motor 2, the power converting apparatus 1 according to the first embodiment compensates for the velocity command value $\omega^*_{(ave)}$ by using the velocity command-value compensation amount $\Delta\omega^*$ generated by the load-pulsation compensating unit 20 and compensates for the carrier by using the carrier-frequency command-value compensation amount Δfc* generated by the load-pulsation compensating unit 20, without controlling the response speed of the velocity control unit 24 and the current control unit 25. Periodic pulsation in the load torque is thereby suppressed.

Figure 7:
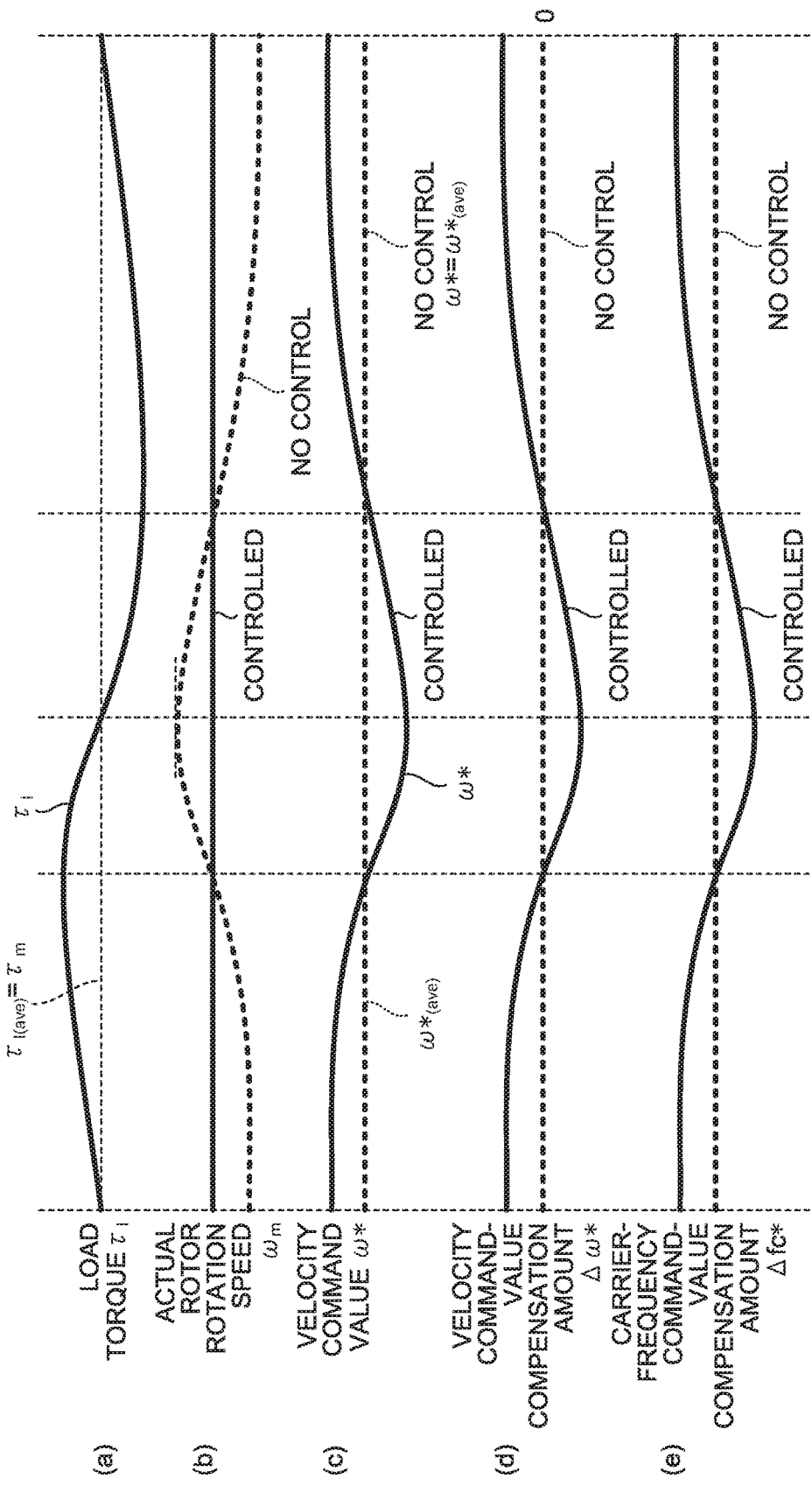
FIG. 7 is a diagram illustrating a relation between a load torque, an actual rotor rotation speed, a velocity command value, a velocity command-value compensation amount, and a carrier-frequency command-value compensation amount according to the first embodiment.

The operation of the load-pulsation compensating unit 20 is described below in detail. FIG. 7 is a diagram illustrating a relation between the load torque $\tau_l$, the actual rotor rotation speed $\omega_m$, the velocity command value $\omega^*$, the velocity command-value compensation amount $\Delta\omega^*$, and the carrier-frequency command-value compensation amount $\Delta fc^*$ in a case where a load in which toque pulsation occurs at a constant period is connected to the motor 2. $\tau_l$ indicates an instantaneous value of the load torque. $\tau_{l(ave)}$ indicates the average value of the load torque. $\omega^*_{(ave)}$ indicates the average rotation-speed command value that is a velocity command value provided from a higher-level controller for the motor control unit 18.

The velocity command-value compensation amount $\Delta\omega^*$ is set on the basis of conditions represented in the following Inequalities (2) and (3).

$$\text{if } \tau_l > \tau_m \text{ then } \Delta\omega^* > 0 \qquad (2)$$

$$\text{if } \tau_l < \tau_m \text{ then } \Delta\omega^* < 0 \qquad (3)$$

The conditions represented in Inequalities (2) and (3) are derived as described below. When the load-pulsation compensating unit 20 does not function, that is, when "$\omega^* = \omega^*_{(ave)}$", then the actual motor rotation speed $\omega_m$ pulsates on the basis of the load-torque pulsation. In particular, for the condition represented in Inequality (2), the actual motor rotation speed $\omega_m$ is reduced on the basis of Equation (1). For the condition represented in Inequality (3), the actual motor rotation speed $\omega_m$ is increased on the basis of Equation (1).

The load-pulsation compensating unit 20 changes the velocity command value $\omega^*$ by the velocity command-value compensation amount $\Delta\omega^*$. Specifically, for the condition represented in Inequality (2), the load-pulsation compensating unit 20 increases the velocity command value $\omega^*$ so that the actual motor rotation speed $\omega_m$ is not reduced. For the condition represented in Inequality (3), the load-pulsation compensating unit 20 reduces the velocity command value $\omega^*$ so that the actual motor rotation speed $\omega_m$ is not increased. Thus, the power converting apparatus 1 can suppress pulsation in the actual motor rotation speed $\omega_m$ through the operation of the load-pulsation compensating unit 20.

Next, a procedure for determining the velocity command-value compensation amount $\Delta\omega^*$ is described. In a case where the load torque pulsates at a constant period, a pulsating component of the load torque can be identified in advance. Thus, the velocity command-value compensation amount $\Delta\omega^*$ can be determined in advance at the time of designing a motor control system and accordingly the feed-forward control can be used. It is possible to have a configuration in which the velocity command-value compensation amount $\Delta\omega^*$ based on the load-torque pulsation is stored in a memory as a map. The inverter control unit 13 may be implemented by a microcomputer or a Digital Signal Processor (DSP) including the memory. The load-pulsation compensating unit 20 reads the velocity command-value compensation amount $\Delta\omega^*$ stored in the memory and compensates for the velocity command value $\omega^*_{(ave)}$ by using the velocity command-value compensation amount $\Delta\omega$.

The load-pulsation compensating unit 20 according to the first embodiment selects the velocity command-value compensation amount $\Delta\omega^*$ on the basis of the velocity command value $\Delta^*_{(ave)}$ on the assumption that the load torque becomes higher on the basis of the actual rotor rotation speed $\omega_m$ as in a case of a compressor. The correlation between the conditions represented in Inequalities (2) and (3) and a procedure for selecting the velocity command-value compensation amount $\Delta\omega^*$ will be described later in a second embodiment.

Next, the operation of the synchronous PWM control unit 19 is described. The carrier-frequency command-value compensation amount $\Delta fc^*$ is set on the basis of the conditions represented in the following Inequalities (4) and (5).

$$\text{if } \tau_l > \tau_m \text{ then } \Delta fc^* > 0 \qquad (4)$$

$$\text{if } \tau_l < \tau_m \text{ then } \Delta fc^* < 0 \qquad (5)$$

The conditions represented in Inequalities (4) and (5) are derived as described below. As described above, on the basis of Inequalities (2) and (3), the velocity command value $\omega^*$ is updated to reflect the velocity command-value compensation amount $\Delta\omega^*$ based on the load-torque pulsation. Thus, the frequency of a voltage output from the inverter 12 also needs to be changed on the basis of the velocity command value $\omega^*$. Accordingly, in order to maintain an integer multiple relation between the carrier frequency and the frequency of the voltage output from the inverter 12, a compensation amount also needs to be set for the synchronous PWM control unit 19 on the basis of the velocity command-value compensation amount $\Delta\omega^*$.

A procedure for determining the carrier-frequency command-value compensation amount $\Delta fc^*$ is described below. The synchronous PWM control is to control the carrier frequency so as to become an integer multiple of the frequency of the voltage output from the inverter 12. Thus, the carrier-frequency command-value compensation amount $\Delta fc^*$ can be calculated on the basis of the following Equation (6). N in Equation (6) indicates the number of pulses in the synchronous PWM control. Equation (6) is an example of calculation of the carrier-frequency command-value compensation amount $\Delta fc^*$.

$$\Delta fc^* = N \times \Delta\omega^* \qquad (6)$$

The correlation between the conditions represented in Inequalities (4) and (5) and the procedure for selecting the carrier-frequency command-value compensation amount $\Delta fc^*$ will be described later in the second embodiment.

In a case where a load in which torque pulsation occurs at a constant period is connected to the motor 2, the power converting apparatus 1 according to the first embodiment compensates for the velocity command value $\omega^*_{(ave)}$ by using the velocity command-value compensation amount $\Delta\omega^*$ generated by the load-pulsation compensating unit 20. Also, the power converting apparatus 1 compensates for the carrier by using the carrier-frequency command-value compensation amount $\Delta fc^*$ generated by the load-pulsation compensating unit 20. Thus, even when the load torque pulsates periodically, the power converting apparatus 1 can still perform synchronous PWM modulation in a stable manner.

Second Embodiment

The power converting apparatus 1 according to the first embodiment selects the velocity command-value compensation amount $\Delta\omega^*$ and the carrier-frequency command-value compensation amount $\Delta fc^*$ in accordance with the relation between the motor output torque $\tau_m$ and the load torque $\tau_l$ by using the conditions represented in Inequalities (2) to (5).

However, it may be difficult to detect the load torque during driving of the motor 2 in some cases. The velocity command-value compensation amount Δω* and the carrier-frequency command-value compensation amount Δfc* are determined in advance on the basis of the load torque, and thereafter stored as a map in the memory of the inverter control unit 13. Even in that case, if the load torque cannot be measured or detected during operation, an alternative indicator is needed to select the velocity command-value compensation amount Δω* and the carrier-frequency command-value compensation amount Δfc*.

Figure 8:
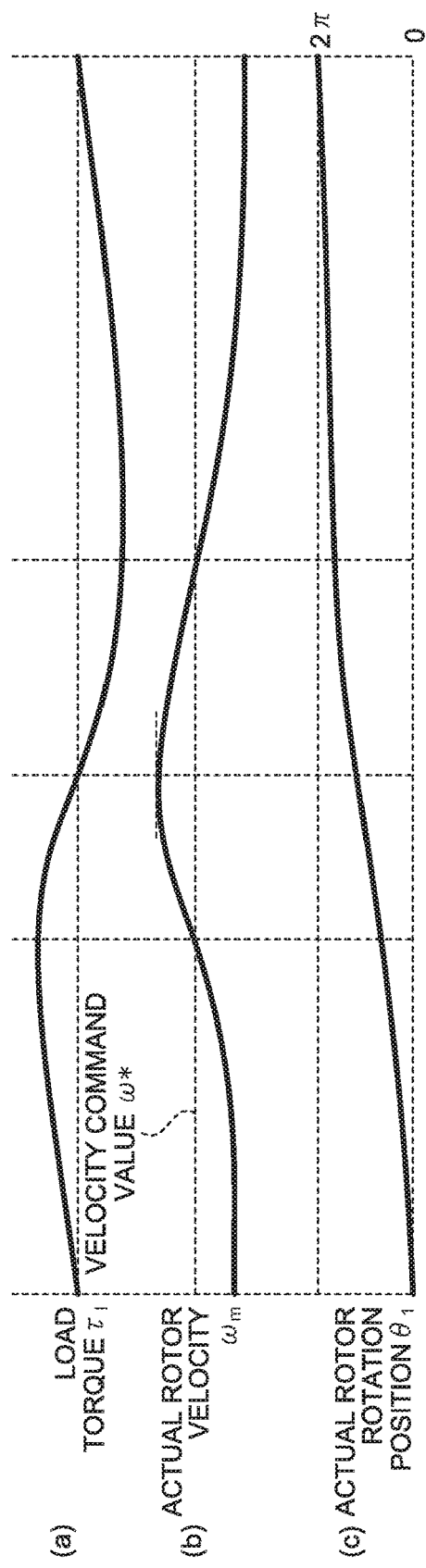
FIG. 8 is a diagram illustrating a relation between a load torque, an actual rotor rotation speed, and an actual rotor rotation position according to a second embodiment.

In the second embodiment, a case is described where the motor rotation position θ is used as the alternative indicator. FIG. 8 is a diagram illustrating a relation between the load torque $\tau_l$, the actual rotor rotation speed $\omega_m$, and the actual rotor rotation position $\theta_1$ of the motor 2 in a case where a load in which torque pulsation occurs at a constant period is connected to the motor 2.

In FIG. 8, it is assumed that the load torque pulsates periodically. Periodicity is correlated with the actual rotor rotation position $\theta_1$. FIG. 8 illustrates a case where the load torque $\tau_l$ pulsates once per period of the actual rotor rotation position $\theta_1$. However, the load torque $\tau_l$ may pulsate twice per period of the actual rotor rotation position $\theta_1$.

The load-pulsation compensating unit 20 can select the velocity command-value compensation amount Δω* and the carrier-frequency command-value compensation amount Δfc* on the basis of the actual rotor rotation position $\theta_1$.

In a case of driving with a position sensor, that is, a configuration including a position detection mechanism, the actual rotor rotation position $\theta_1$ can be directly detected. However, the power converting apparatus 1 according to the second embodiment executes sensorless position control and thus does not include a position detection mechanism or cannot directly detect the actual rotor rotation position $\theta_1$. Accordingly, the power converting apparatus 1 according to the second embodiment uses the rotor magnetic-pole position θ calculated by the estimating unit 23.

Figure 9:
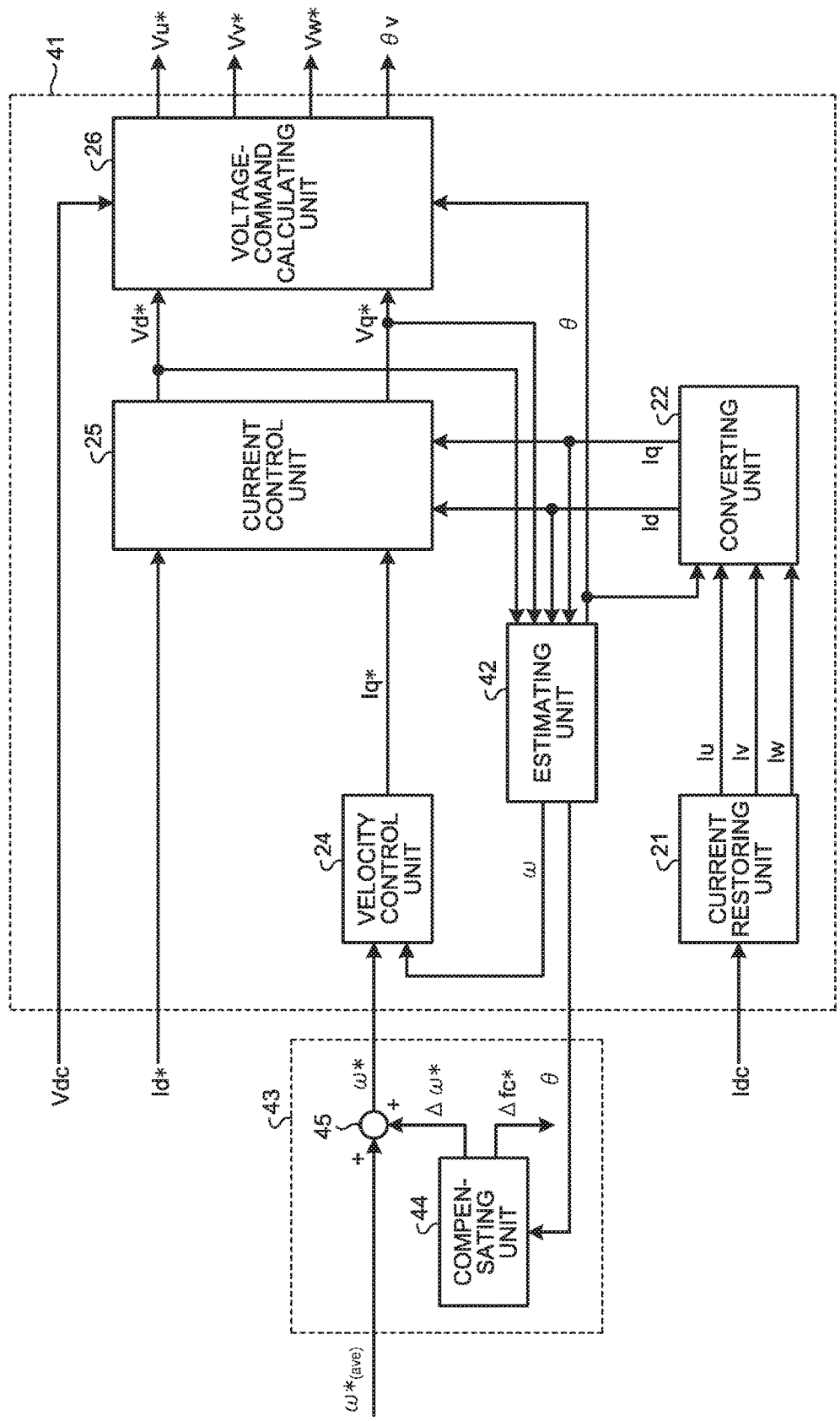
FIG. 9 is a diagram illustrating a configuration of a motor control unit and a load-pulsation compensating unit according to the second embodiment.

FIG. 9 is a diagram illustrating a configuration of a motor control unit 41 and a load-pulsation compensating unit 43 according to the second embodiment. The motor control unit 41 and the load-pulsation compensating unit 43 are different in configuration from the motor control unit 18 and the load-pulsation compensating unit 20 according to the first embodiment in that the rotor magnetic-pole position θ is input to a compensating unit 44 and the velocity command-value compensation amount Δω* is selected on the basis of the input rotor magnetic-pole position θ. The other constituent elements are identical to those of the motor control unit 18 and the load-pulsation compensating unit 20 according to the first embodiment, and therefore such constituent elements are denoted by like reference signs and explanations thereof are omitted.

An estimating unit 42 calculates the rotor magnetic-pole position θ and the estimated velocity value ω of the motor 2 on the basis of the electric currents Id and Iq and the voltage command values Vd* and Vq* generated by the current control unit 25. The estimating unit 42 outputs the estimated velocity value ω to the velocity control unit 24 and outputs the rotor magnetic-pole position θ to the voltage-command calculating unit 26 and the load-pulsation compensating unit 43.

The load-pulsation compensating unit 43 includes the compensating unit 44 that calculates the velocity command-value compensation amount Δω* and the carrier-frequency command-value compensation amount Δfc*; and an adder 45 that generates the velocity command value ω*.

On the basis of the rotor magnetic-pole position θ, the compensating unit 44 calculates the velocity command-value compensation amount Δω* and the carrier-frequency command-value compensation amount Δfc*. The adder 45 adds the velocity command value $\omega^*_{(ave)}$ and the velocity command-value compensation amount Δω* together to generate the velocity command value ω*.

Figure 10:
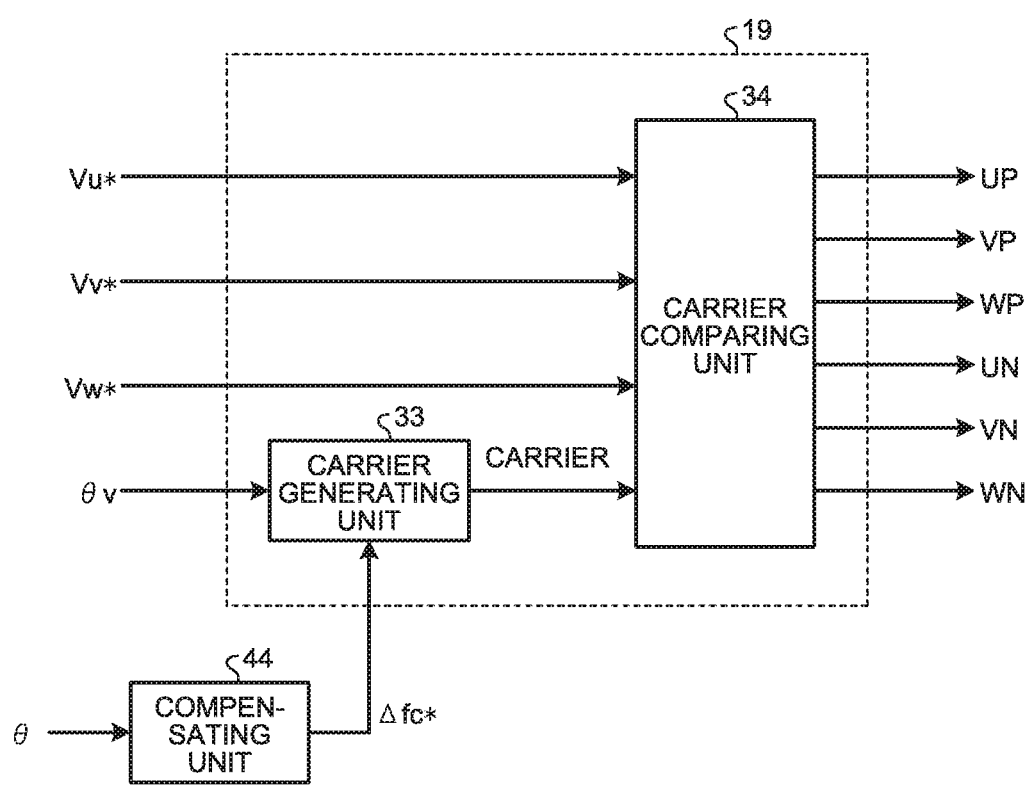
FIG. 10 is a diagram illustrating a configuration of a synchronous PWM control unit and a compensating unit according to the second embodiment.

FIG. 10 is a diagram illustrating the configuration of the synchronous PWM control unit 19 and the compensating unit 44 according to the second embodiment. The synchronous PWM control unit 19 and the compensating unit 44 according to the second embodiment are different in configuration from the synchronous PWM control unit 19 and the compensating unit 31 according to the first embodiment in that the rotor magnetic-pole position θ is input to the compensating unit 44 and the carrier-frequency command-value compensation amount Δfc* is selected on the basis of the input rotor magnetic-pole position θ. The other constituent elements are identical to those of the synchronous PWM control unit 19 according to the first embodiment, and therefore such constituent elements are denoted by like reference signs and explanations thereof are omitted.

Thus, the power converting apparatus 1 according to the second embodiment compensates for the velocity command value $\omega^*_{(ave)}$ by using the velocity command-value compensation amount Δω* selected on the basis of the rotor magnetic-pole position of the motor 2. Also, the power converting apparatus 1 compensates for the carrier by using the carrier-frequency command-value compensation amount Δfc* selected on the basis of the rotor magnetic-pole position of the motor 2. Consequently, in a case where periodic pulsation has occurred in a load connected to the motor 2, the frequency of a synchronous PWM signal output from the synchronous PWM control unit 19 is periodically varied on the basis of the rotor magnetic-pole position of the motor 2. Thus, even when the load torque pulsates periodically, the power converting apparatus 1 can still perform synchronous PWM modulation in a stable manner.

Third Embodiment

In the second embodiment, the motor rotation position θ is defined as an indicator for selecting the velocity command-value compensation amount Δω* and the carrier-frequency command-value compensation amount Δfc*. In a third embodiment, a case is described in which the q-axis current Iq is defined as an indicator for selecting the velocity command-value compensation amount Δω* and the carrier-frequency command-value compensation amount Δfc*.

Figure 11:
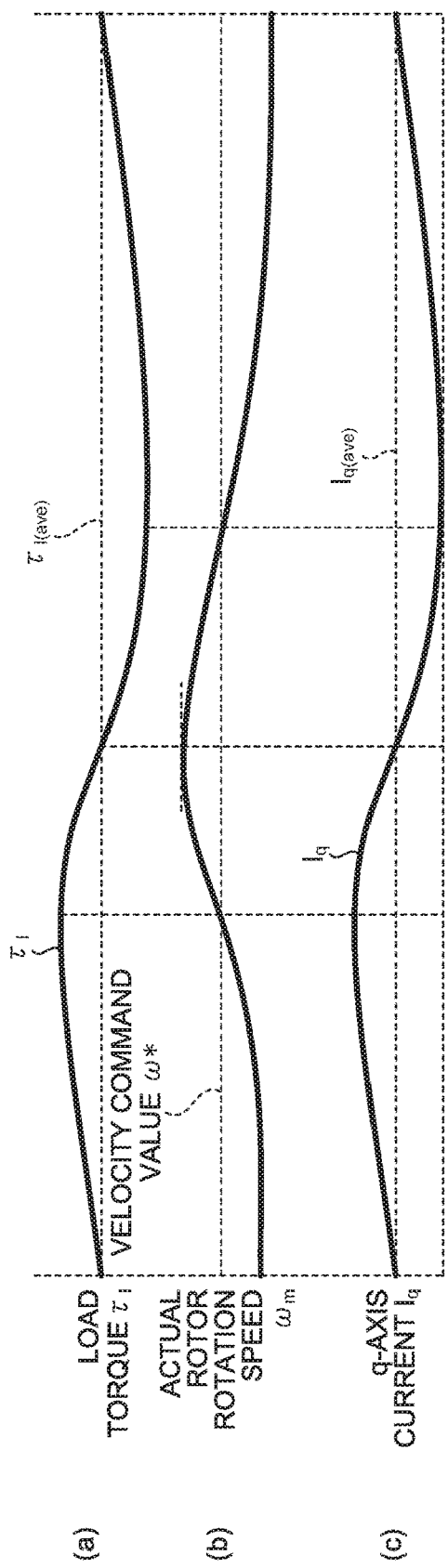
FIG. 11 is a diagram illustrating a relation between a load torque, an actual rotor rotation speed, and a q-axis current according to a third embodiment.

FIG. 11 is a diagram illustrating a relation between the load torque $\tau_l$, the actual rotor rotation speed $\omega_m$, and the q-axis current Iq. $Iq_{(ave)}$ indicates the average motor-current value.

The q-axis current Iq that flows when the load torque $T_1$ is higher than the average load-torque value $\tau_{l(ave)}$, that is, when "$\tau_l > \tau_{l(ave)}$" is greater than the average motor-current value $Iq_{(ave)}$ that flows when "$\tau_l = \tau_{l(ave)}$". In contrast, the q-axis current Iq that flows when the load torque $\tau_l$ is lower than the average load-torque value $\tau_{l(ave)}$, that is, when "$\tau_l < \tau_{l(ave)}$" is less than the average motor-current value $Iq_{(ave)}$ that flows when "$\tau_l = \tau_{l(ave)}$".

Thus, the state of the load torque can be identified on the basis of the magnitude of the q-axis current Iq. Accordingly, the q-axis current Iq can be defined as an indicator for selecting the velocity command-value compensation amount Δω* and the carrier-frequency command-value compensation amount Δfc*. The q-axis current Iq indicates a torque component.

Figure 12:
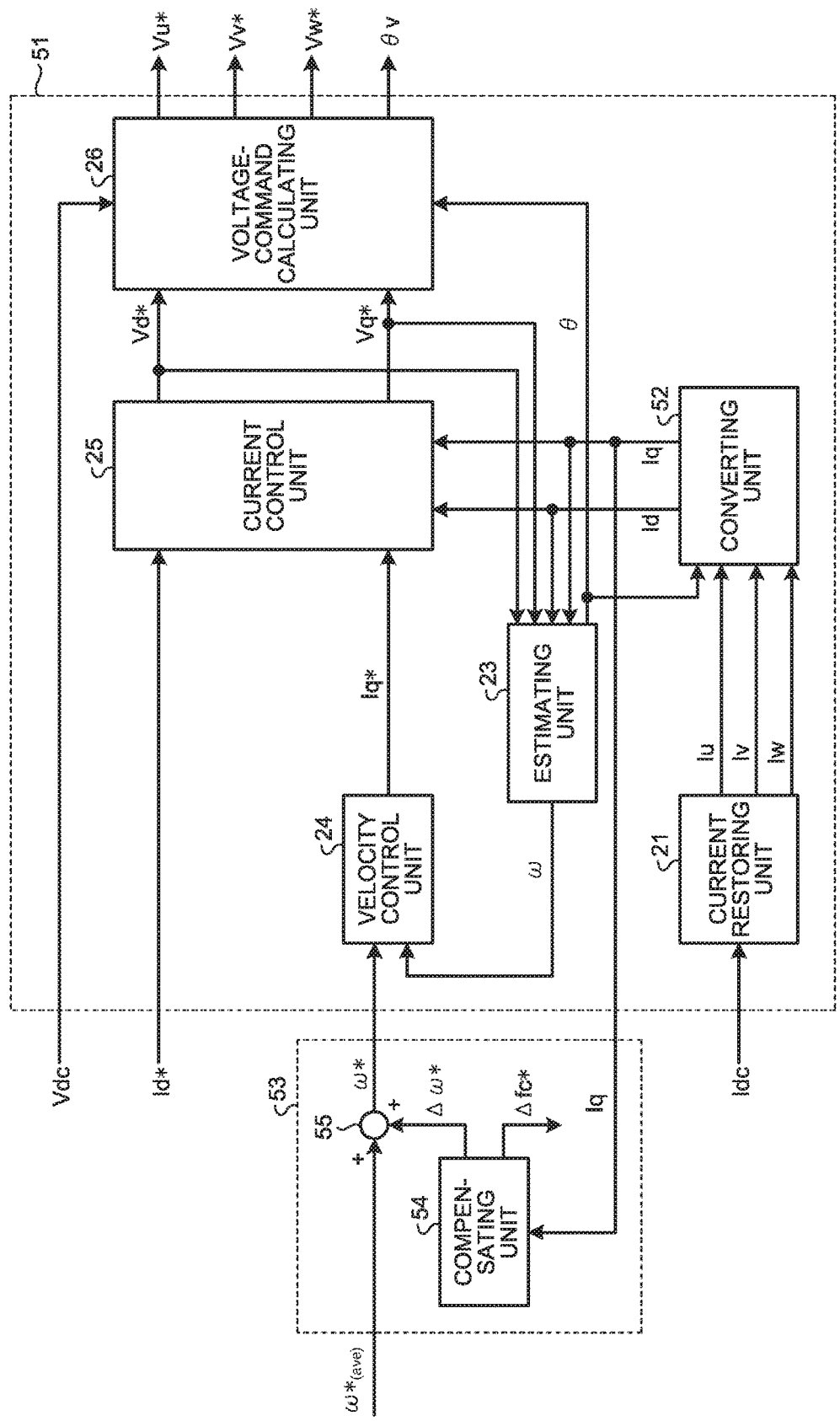
FIG. 12 is a diagram illustrating a configuration of a motor control unit and a load-pulsation compensating unit according to the third embodiment.

FIG. 12 is a diagram illustrating a configuration of a motor control unit 51 and a load-pulsation compensating unit 53 according to the third embodiment. The motor control unit 51 and the load-pulsation compensating unit 53 are different in configuration from the motor control unit 18 and the load-pulsation compensating unit 20 according to the first embodiment in that the q-axis current Iq is input to a compensating unit 54 and the velocity command-value compensation amount Δω* is selected on the basis of the input q-axis current Iq. The other constituent elements are identical to those of the motor control unit 18 and the load-pulsation compensating unit 20 according to the first embodiment, and therefore such constituent elements are denoted by like reference signs and explanations thereof are omitted.

On the basis of the rotor magnetic-pole position θ of the motor 2, a converting unit 52 converts the phase currents Iu, Iv, and Iw, which are three phase currents, into two phase currents, and converts the two phase currents into the d-axis current Id and the q-axis current Iq on the d-q coordinate axes. The converting unit 52 outputs the d-axis current Id to the estimating unit 23 and the current control unit 25, and outputs the q-axis current Iq to the estimating unit 23, the current control unit 25, and the load-pulsation compensating unit 53.

The load-pulsation compensating unit 53 includes the compensating unit 54 that calculates the velocity command-value compensation amount Δω* and the carrier-frequency command-value compensation amount Δfc*; and an adder 55 that generates the velocity command value ω*.

On the basis of the q-axis current Iq, the compensating unit 54 calculates the velocity command-value compensation amount Δω* and the carrier-frequency command-value compensation amount Δfc*. The adder 55 adds the velocity command value ω*$_{(ave)}$ and the velocity command-value compensation amount Δω* together to generate the velocity command value ω*.

Figure 13:
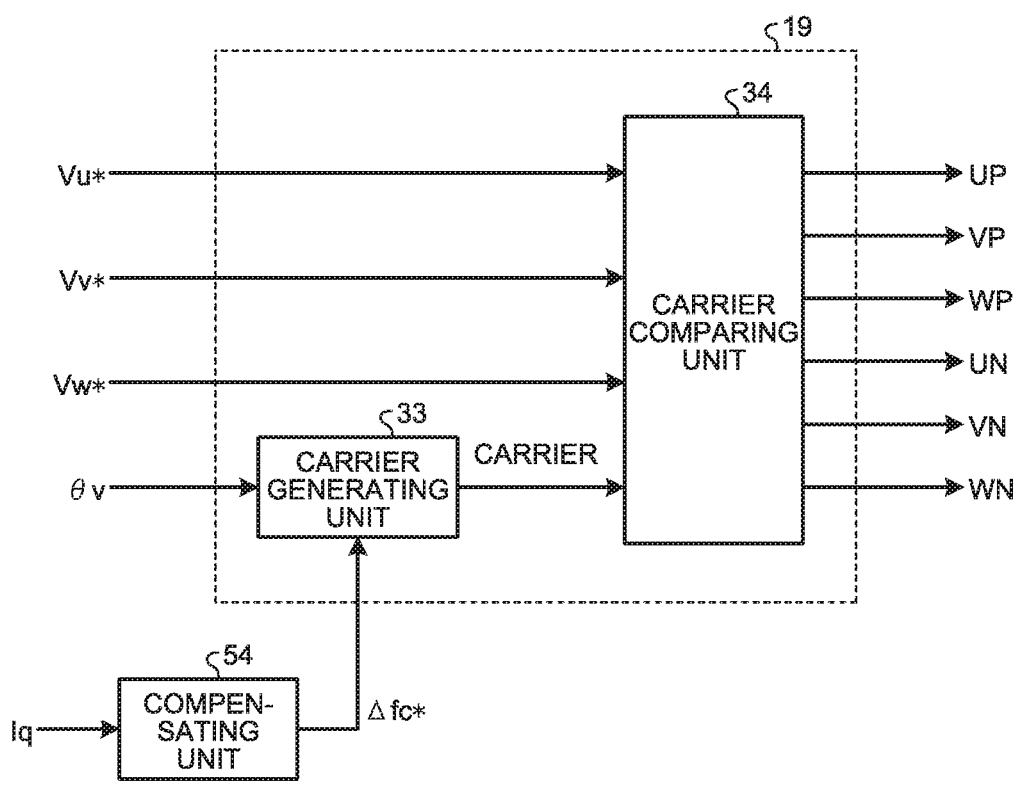
FIG. 13 is a diagram illustrating a configuration of a synchronous PWM control unit and a compensating unit according to the third embodiment.

FIG. 13 is a diagram illustrating the configuration of the synchronous PWM control unit 19 and the compensating unit 54 according to the third embodiment. The synchronous PWM control unit 19 and the compensating unit 54 according to the third embodiment are different in configuration from the synchronous PWM control unit 19 and the compensating unit 31 according to the first embodiment in that the q-axis current Iq is input to the compensating unit 54 and the carrier-frequency command-value compensation amount Δfc* is selected on the basis of the input q-axis current Iq. The other constituent elements are identical to those of the synchronous PWM control unit 19 according to the first embodiment, and therefore such constituent elements are denoted by like reference signs and explanations thereof are omitted.

Thus, the power converting apparatus 1 according to the third embodiment compensates for the velocity command value ω*$_{(ave)}$ by using the velocity command-value compensation amount Δω* selected on the basis of the q-axis current Iq. Also, the power converting apparatus 1 compensates for the carrier by using the carrier-frequency command-value compensation amount Δfc* selected on the basis of the q-axis current Iq. Consequently, in a case where periodic pulsation has occurred in a load connected to the motor 2, the frequency of a synchronous PWM signal output from the synchronous PWM control unit 19 is periodically varied on the basis of the q-axis current Iq that is an electric current flowing to the motor 2. Thus, even when the load torque pulsates periodically, the power converting apparatus 1 can still perform synchronous PWM modulation in a stable manner.

A description has been given where the power converting apparatus 1 in the second embodiment is configured such that the velocity command-value compensation amount Δω* and the carrier-frequency command-value compensation amount Δfc* are selected on the basis of the rotor magnetic-pole position and the power converting apparatus 1 in the third embodiment is configured such that the velocity command-value compensation amount Δω* and the carrier-frequency command-value compensation amount Δfc* are selected on the basis of the q-axis current Iq. It is also permissible to employ a configuration to select the velocity command-value compensation amount Δω* and the carrier-frequency command-value compensation amount Δfc* on the basis of the maximum value of the phase currents Iu, Iv, and Iw, the peak-to-peak value of the phase currents Iu, Iv, and Iw, the effective value of the phase currents Iu, Iv, and Iw, the average value of the phase currents Iu, Iv, and Iw, or any of the phase currents Iu, Iv, and Iw.

Fourth Embodiment

Figure 14:
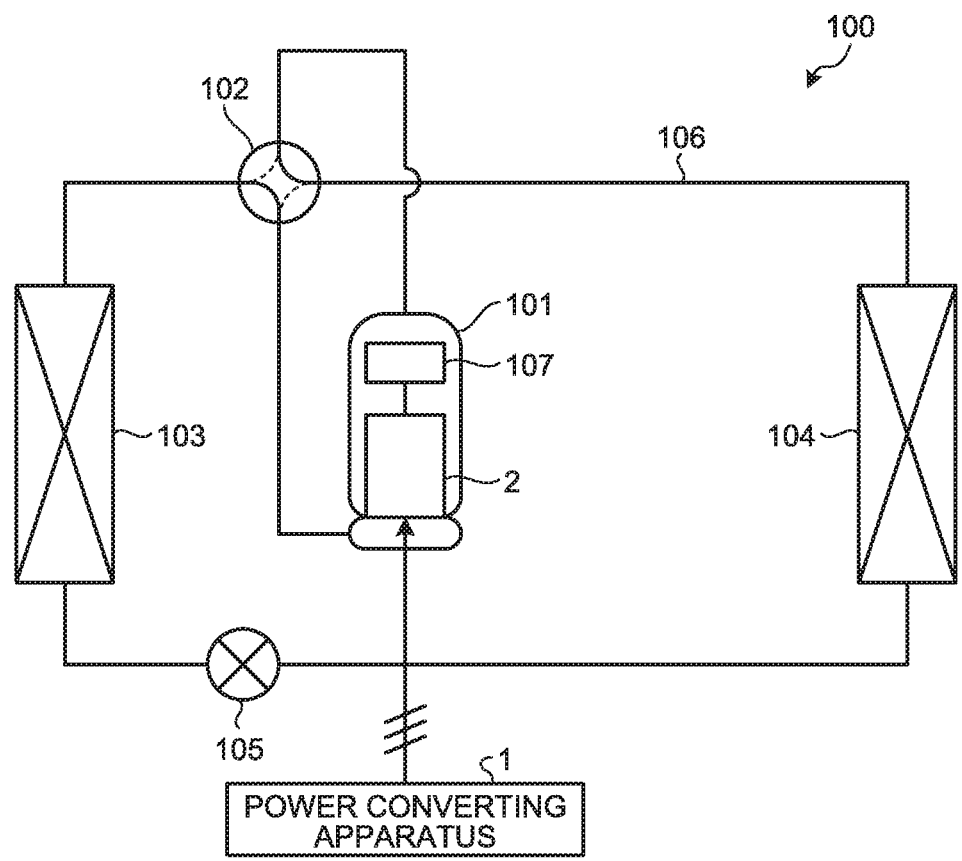
FIG. 14 is a diagram illustrating a configuration of a heat pump device according to a fourth embodiment.

The power converting apparatus 1 according to the first to third embodiments may be included in a heat pump device 100. FIG. 14 is a diagram illustrating the configuration of the heat pump device 100 according to a fourth embodiment.

The heat pump device 100 includes a refrigeration cycle in which a compressor 101 having a compression mechanism that compresses a refrigerant, a four-way valve 102 that changes the direction of refrigerant gas, heat exchangers 103 and 104, and an expansion mechanism 105 are sequentially connected via a refrigerant pipe 106. The direction of refrigerant gas is switched to a first direction by the four-way valve 102, and thereby the heat exchanger 103 serves as an evaporator while the heat exchanger 104 serves as a condenser. In addition, the direction of the refrigerant gas is switched to a second direction by the four-way valve 102, and thereby the heat exchanger 103 serves as a condenser while the heat exchanger 104 serves as an evaporator. In FIG. 14, the four-way valve 102 has switched the direction of refrigerant gas to the first direction.

The compressor 101 includes a compression mechanism 107 that compresses a refrigerant and the motor 2 that operates the compression mechanism 107. The motor 2 is a three-phase motor including windings for three phases that are a U-phase, a V-phase, and a W-phase. The motor 2 is driven by being supplied with an alternating-current voltage from the power converting apparatus 1.

In a case where the compression mechanism 107 in which torque pulsation occurs at a constant period is connected to the motor 2, the heat pump device 100 according to the fourth embodiment compensates for the velocity command value ω*$_{(ave)}$ by using the velocity command-value compensation amount Δω* and also compensates for the carrier by using the carrier-frequency command-value compensation amount Δfc*. Thus, even when the load torque pulsates periodically, the heat pump device 100 can still perform synchronous PWM modulation in a stable manner. The heat pump device 100 is applicable to an air conditioning device.

Figure 15:
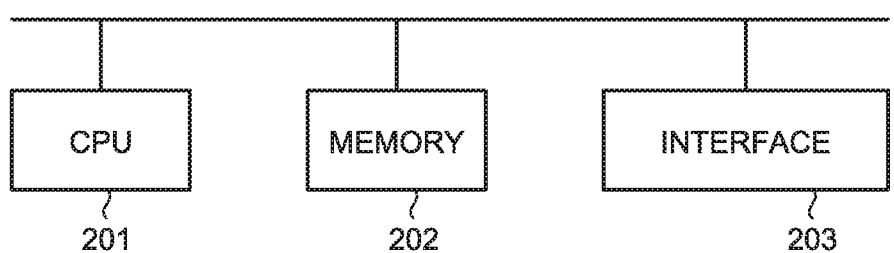
FIG. 15 is a diagram illustrating a configuration example of hardware for realizing the power converting apparatus according to the first to third embodiments.

As illustrated in FIG. 15, the inverter control unit 13 in the power converting apparatus 1 according to the first to third embodiments may be configured from a CPU 201 that performs calculation, a memory 202 that stores therein a program read by the CPU 201, and an interface 203 that inputs and outputs signals.

Specifically, a program that executes functions of the inverter control unit 13 is stored in the memory 202. The voltage Vdc detected by the direct-current-voltage detecting unit 14 and the electric current Idc detected by the current detecting unit 15 are input to the CPU 201 via the interface 203. The CPU 201 then generates the synchronous PWM signals UP, VP, WP, UN, VN, and WN and outputs the generated synchronous PWM signals UP, VP, WP, UN, VN, and WN via the interface 203. The synchronous PWM signals UP, VP, WP, UN, VN, and WN output from the interface 203 are applied to the inverter 12.

The configurations described in the above embodiments are only examples of the content of the present invention. The configurations can be combined with other well-known techniques, and part of each of the configurations can be omitted or modified without departing from the scope of the present invention.

The invention claimed is:
1. A power converting apparatus comprising:
an inverter converting a direct-current voltage supplied from a power supply unit into an alternating-current voltage and outputting the alternating-current voltage to a motor; and
an inverter control unit outputting a synchronous PWM (Pulse Width Modulation) signal for driving a switching element of the inverter, wherein
a frequency of the synchronous PWM signal periodically varies with a change in a rotor position of the motor when periodic pulsation occurs in a load connected to the motor, and
the frequency of the synchronous PWM signal is periodically varied on a basis of an electric current flowing to the motor when periodic pulsation occurs in the load connected to the motor.
2. A heat pump device comprising the power converting apparatus according to claim 1.

\* \* \* \* \*